No. 664,256. Patented Dec. 18, 1900.
W. H. GATES.
DRIVE CHAIN.
(Application filed Feb. 26, 1900.)
(No Model.)
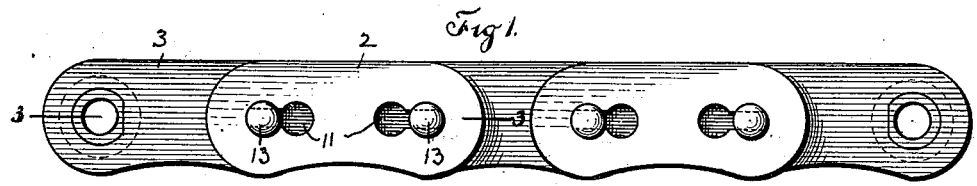
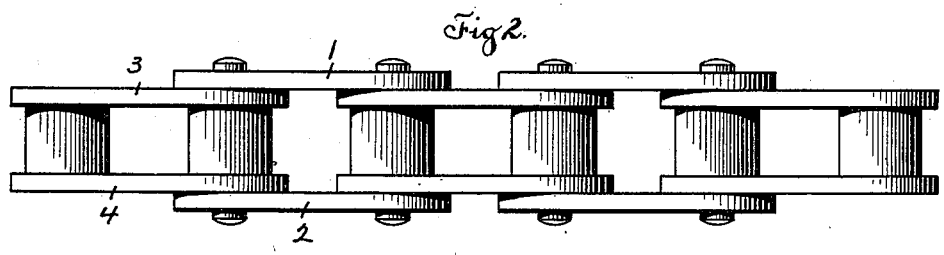
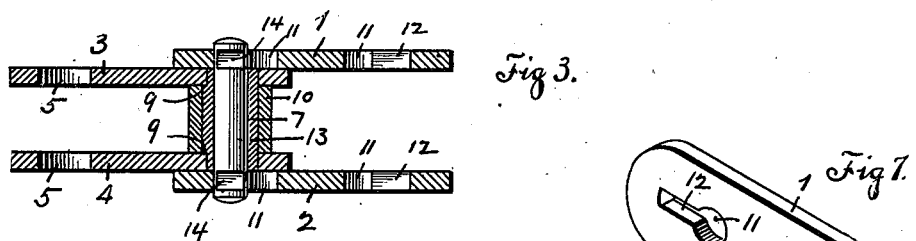
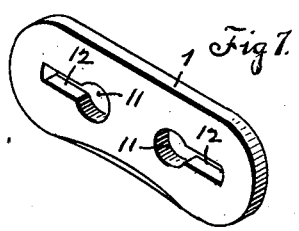
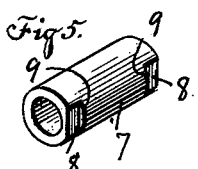
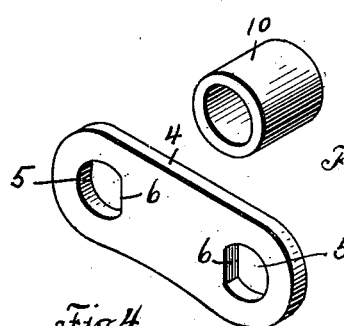
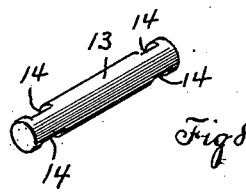
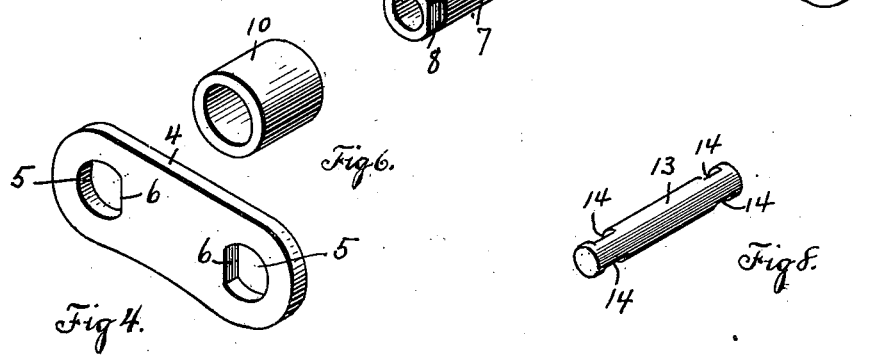
Witnesses:
Harry M. Rugg.
Ava T. Murphy.
Inventor.
William H. Gates
By Rufus B. Fowler
Attorney
THE NORRIS PETERS CO., PHOTO-LITHO., WASHINGTON, D. C.

UNITED STATES PATENT OFFICE.

WILLIAM H. GATES, OF WORCESTER, MASSACHUSETTS.

DRIVE-CHAIN.

SPECIFICATION forming part of Letters Patent No. 664,256, dated December 18, 1900.

Application filed February 26, 1900. Serial No. 6,650. (No model.)

*To all whom it may concern:*

Be it known that I, WILLIAM H. GATES, a citizen of the United States, residing at Worcester, in the county of Worcester and Commonwealth of Massachusetts, have invented a new and useful Improvement in Drive-Chains, of which the following is a specification, accompanied by drawings forming a part of the same, in which—

Figure 1 represents a side view of a portion of a drive-chain embodying my invention. Fig. 2 is a top view of the same. Fig. 3 is a sectional view on line 3 3, Fig. 1. Fig. 4 is a detached view of one of the inside links. Fig. 5 is a tubular pin by which a pair of inside links like the one shown in Fig. 4 are united. Fig. 6 represents a roll held on the tubular pin shown in Fig. 5. Fig. 7 is one of the outside links, and Fig. 8 represents a pin which passes through the tubular pin shown in Fig. 5 and unites the outside links.

Similar reference-figures refer to similar parts in the different views.

My invention relates to a drive-chain particularly adapted for use upon bicycles and automobiles and for similar purposes and consisting of a series of links pivoted together at their ends and arranged in pairs, with the ends of the links overlapping each other; and my invention consists in the construction and arrangement of parts, as hereinafter described, and pointed out in the annexed claims. The chain embodying my invention comprises two series of links, designated as "outside" and "inside" links, which are arranged in pairs.

Referring to the drawings, 1 and 2 denote a pair of the outside links and 3 and 4 a pair of the inside links of the chain. The inside links are provided near their ends with holes 5, each of said holes being circular throughout about three-quarters of its extent, but with the inside of each hole straight, as at 6 6, forming segmental holes, and the ends of each pair of inside links are united by a tubular pin 7, whose outer diameter equals the diameter of the holes 5, each end of the tubular pin having one side cut away, as at 8, forming a segmental end in cross-section to fit the straight side 6 of the hole and form a shoulder 9, which abuts against the inner side of the inside links.

A roll 10 is placed upon the tubular pin 7 and is capable of turning freely thereon as the roll comes in contact with the teeth of the sprocket-wheel. The outside links 1 and 2 are provided with circular holes 11 and slots 12, communicating with the holes 11, and the ends of the outside links are united by means of a pin 13, which passes through the tubular pin 7, having its diameter equal to the diameter of the holes 11 and being cut away on opposite sides near each end, as at 14, Fig. 8, by which the thickness of the pin is reduced to the width of the slots 12 and forming a neck, so that when the end of the pin is entered through the holes 11 and the pin is turned to bring the necks 14 in alinement with slots 12 the entrance of the necks into the slots 12 will hold the side links from movement on the pins 13, but will allow the links to be detached by sliding the pins in the slots 12 and withdrawing their ends through the holes 11. By cutting away or slabbing the sides of the tubular pin 7, as at 8, and forming shoulders 9 I prevent the pin 7 from turning within the inside links and form a fixed support for the rotating roll 10. The inside links 3 and 4 are held between the shoulders 9 and the overlapping ends of the outside links 1 and 2, so that by removing the outside links 1 and 2 the inside links may be driven off the ends of the tubular pin 7, thereby releasing the roll 10 and allowing the chain to be entirely separated into its individual parts, which may be replaced when worn or broken.

What I claim as my invention, and desire to secure by Letters Patent, is—

1. In a drive-chain, the combination of a pair of inside links having segmental holes, a tubular pin, a cylindrical pin inclosed in said tubular pin and having necks 14, and outside links provided with holes 11 to receive the ends of said cylindrical pins and having slots 12 communicating with said holes to receive the necks 14, substantially as described.

2. In a drive-chain, the combination of links 3 and 4 having segmental holes in their ends, tubular pins 7 having segmental ends fitting said holes, rolls 10 carried on said tubular pins, cylindrical pins 13 having necks 14 and outside links 1 and 2 provided with holes 11 and slots 12 to receive the ends of said cylindrical pins, substantially as described.

In testimony whereof I have signed my name to this specification, in presence of two subscribing witnesses, this 17th day of February, 1900.

WILLIAM H. GATES.

Witnesses:
RUFUS B. FOWLER,
AVA T. MURPHY.